US007096277B2

(12) United States Patent
Hooper

(10) Patent No.: US 7,096,277 B2
(45) Date of Patent: Aug. 22, 2006

(54) DISTRIBUTED LOOKUP BASED ON PACKET CONTENTS

(75) Inventor: Donald F. Hooper, Shrewsbury, MA (US)

(73) Assignee: Intel Corporation, Santa Clara, CA (US)

(*) Notice: Subject to any disclaimer, the term of this patent is extended or adjusted under 35 U.S.C. 154(b) by 888 days.

(21) Appl. No.: 10/214,984

(22) Filed: Aug. 7, 2002

(65) Prior Publication Data

US 2004/0052254 A1 Mar. 18, 2004

(51) Int. Cl.
*G06F 15/173* (2006.01)

(52) U.S. Cl. .................. 709/238; 709/245; 370/389; 370/392; 370/395.32; 707/6; 707/10

(58) Field of Classification Search ................ 709/238, 709/245, 213, 216, 223–224; 370/389, 392, 370/395.32; 707/6, 10; 711/216
See application file for complete search history.

(56) References Cited

U.S. PATENT DOCUMENTS

| 6,266,705 B1* | 7/2001 | Ullum et al. ............... 709/238 |
| 6,424,650 B1* | 7/2002 | Yang et al. .................. 370/390 |
| 6,658,482 B1* | 12/2003 | Chen et al. ................. 709/245 |
| 6,792,423 B1* | 9/2004 | Jeffries et al. ............... 709/238 |
| 6,963,567 B1* | 11/2005 | Kaniz et al. ................. 370/392 |
| 7,002,965 B1* | 2/2006 | Cheriton ..................... 709/238 |

OTHER PUBLICATIONS

Waldvogel et al, "Scalable High Speed IP Routing Lookups", ACM 1997.*
Chen et al, "A Fast and Scalable IP Lookup Scheme for High-Speed Networks", IEEE Oct. 1999.*
"IXP1200 Network Processor", Software Reference Manual, Mar. 2000, Level One an Intel Company, Reference Design, Section 3, pp. 3-1-3-30.
"Intel IXP1200 Network Processor Family", Hardware Reference Manual, Aug. 2001, "Technical Introduction", pp. 17-49.
"ATM/OC-3 to Fast Ethernet IP Router Example Design", Intel Internet Exchange Architecture, Product Brief, 4 Pgs.
"WAN/LAN Access Switch Example Disign for the Intel IXP1200 Network Processor", Intel Internet Exchange Architecture, Product Brief, 4 Pgs.

* cited by examiner

Primary Examiner—Philip B. Tran
(74) Attorney, Agent, or Firm—Robert A. Greenberg

(57) ABSTRACT

The disclosure includes description of a technique for use in looking-up data based on content of a packet received over a network. The technique includes receiving a lookup value based on the received packet, searching a first memory using at least a portion of the lookup value, and if the searching the first memory fails, searching a second memory, having a lower latency than the first memory, using at least a portion of the lookup value.

25 Claims, 8 Drawing Sheets

DISTRIBUTED LOOKUP BASED ON PACKET CONTENTS

BACKGROUND

Networks enable computers and other devices to exchange data such as e-mail messages, web pages, audio, video, and so forth. To send data across a network, a sending device typically constructs a collection of packets. Individual packets store some portion of the data being sent. A receiver can reassemble the data into its original form after receiving the packets.

A packet traveling across a network may make many "hops" to intermediate network devices before reaching its final destination. Thus, much like a letter delivered by the post office, a packet includes data being sent and information used to deliver the packet. In technical terms, this information is often stored in the packet's "payload" and "header (s)", respectively. The header(s) may include information for a number of different communication protocols that define the information that should be stored in a packet. Different protocols may operate at different layers. For example, a low level layer generally known as the "link layer" coordinates transmission of data over physical connections. A higher level layer generally known as the "network layer" handles routing, switching, and other tasks that determine how to move a packet forward through a network.

Many different hardware and software schemes have been developed to handle packets. For example, some designs use software to program a general purpose CPU (Central Processing Unit) processor to process packets. Other designs, such as designs using components known as ASICs (application-specific integrated circuits), feature dedicated, "hardwired" approaches.

To combine the programmable flexibility of a CPU with the speed often associated with an ASIC, many vendors sell programmable devices known as network processors. Network processors enable software programmers to quickly reprogram network processor operations. Yet, due to their specially designed architectures, network processors can often rival the packet processing speed of an ASIC.

The versatility of network processors contributes to their appeal. Currently, network processors can be found in a variety of products including routers, switches, firewalls, line cards, and storage area network (SAN) components, among others.

DETAILED DESCRIPTION

Figure 1:
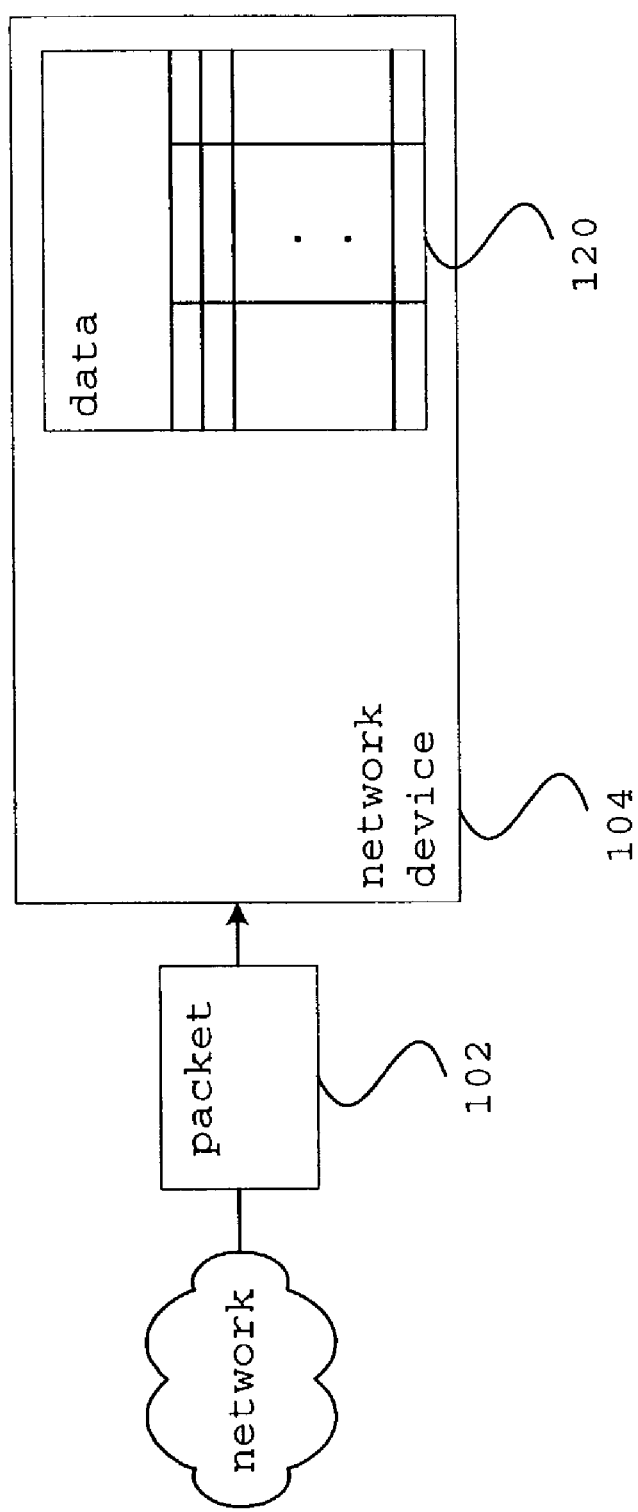
FIG. 1 is a diagram illustrating receipt of a packet.

FIG. 1 depicts the arrival of a packet 102 at a network device 104. The device 104 may handle the packet 102 based on its contents (e.g., information included in its header(s) and/or payload). For example, the device 104 may operate as a router or switch that determines how to forward the packet toward its destination based on data included in the packet's header(s).

To perform operations based on packet contents, the network device 104 can access data 120 that associates different information with different packet 102 contents. For instance, a table 120 may include different entries (e.g., "tuples") for different connections, for example, as identified by a combination of a packet's source address, destination address, source port, destination port, and network protocol. Such connection information can include protocol state variables (e.g., TCP/IP [Transmission Control Protocol/Internet Protocol] state variables, ATM [Asynchronous Transfer Mode] circuit state variables), an outgoing interface associated with the connection, quality-of-service data (e.g., data rate transmission characteristics and transmission priority), connection statistics (e.g., error counts, packet counts, and dropped packet counts), and/or other information (e.g., MTU [Maximum Transmission Unit] data for an interface). Other tables 120 may store other information. For example, a table 120 that associates data with different pairs of Ethernet source and destination addresses may feature entries that identify policies and/or filters that may be applied to a packet.

The time it takes to lookup information within data 120 can add to the overall amount of time taken to process the packet 102. Described herein, however, are techniques that can, potentially, improve access speeds, in certain cases, by distributing the data 120 across different memories.

Figure 2:
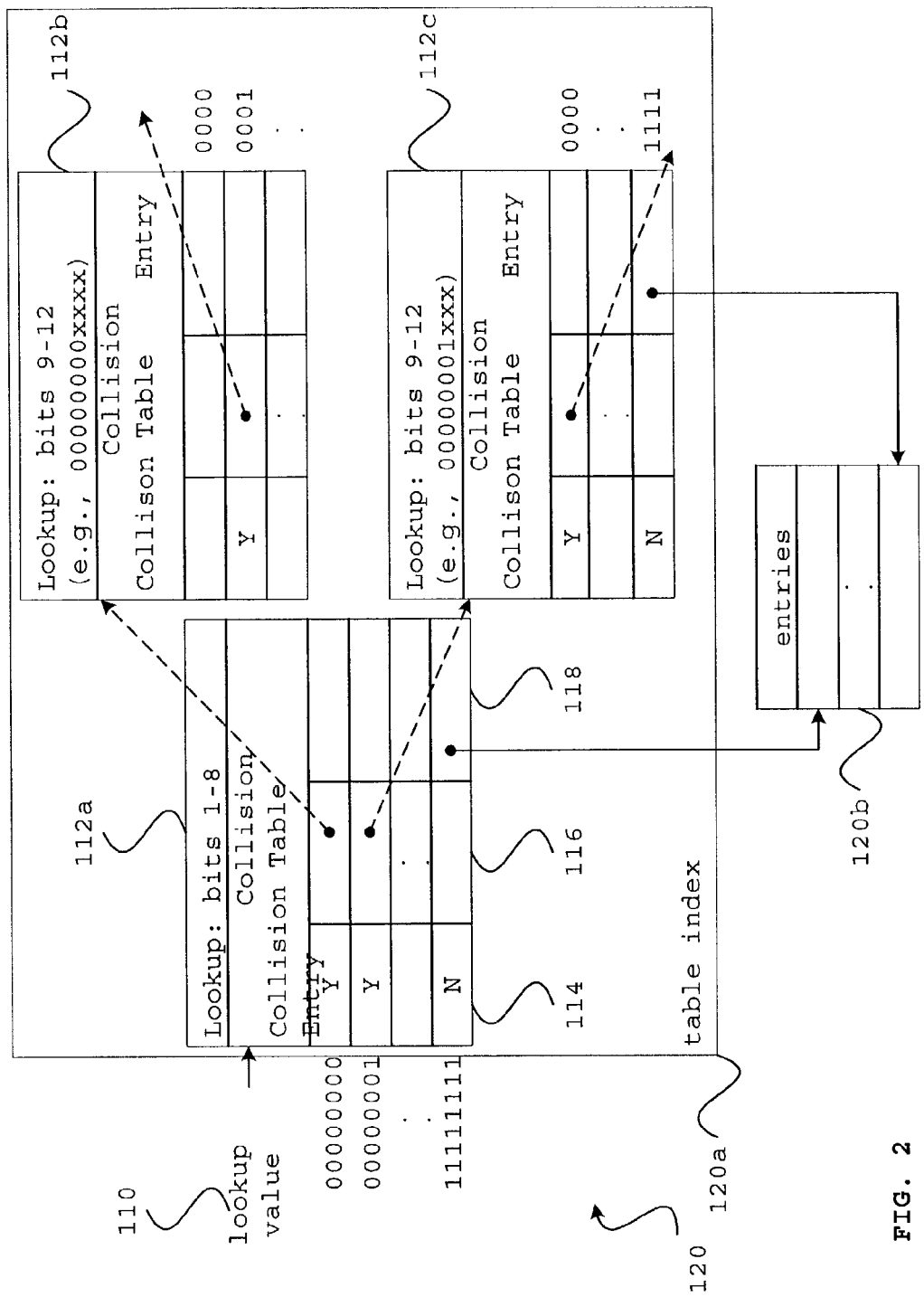
FIGS. 2–4 are diagrams of a lookup scheme.

To illustrate, FIG. 2 depicts a sample implementation of a table 120 that includes table entries 120b. Different entries 120b are associated with different packet contents. The packet contents may be represented by a lookup value 110 based on information included in a packet 102 (e.g., a combination of header fields) and/or the results of a hash operation upon such information. For example, a hash operation may divide a concatenation of header fields by a prime number and return the remainder as the resulting hash value.

To speed access to the entries 120b, the table 120 features a lookup index 120a that identifies the location of an entry associated with a lookup value 110. As shown, the index 120a features a collection of index tables 112a–112c. A given index table 112a–112c can feature entries for a subset of bits in the lookup value 110. For example, a primary index table 112a can include entries for different values of the first n-bits (e.g., the first 8-bits) of the lookup value 110. For instance, the primary index table 112a may include different entries for lookup values 110 starting "0000000", "00000001 ", and so forth up to "11111111".

Potentially, the n-bits of the lookup value are enough to identify an entry 120b for a lookup value 110 (e.g., no other lookup value shares the same values of the first 8 bits). If so, as shown, the index table 112 can include a reference 118 (illustrated as a solid arrowed line), such as a pointer, to the corresponding entry 120b. However, if more than one lookup value 110 shares the same n-bits, a "collision" occurs. For example, a lookup value of "000000001111" and "000000000000" share the same first eight bits (underlined). Thus, in this example, the first eight bits are insufficient to identify different entries for the different lookup values.

For values identified as collisions 114, the index table 112a identifies (depicted as a dashed arrow) another index table 112b, 112c than can operate on a different set of lookup value 110 bits (e.g., the next m-bits). For example, the first row of table 112a identifies index table 112b as the next table to access for lookup values starting "00000000" while the second row of table 112a identifies index table 112c as the next table to access for lookup values starting "00000001".

Secondary index tables 112*b*, 112*c*, in turn, may operate on the next m-bits of the lookup value 110, in this example bits nine to twelve. Again, like the primary index table 112*a*, subsequent index tables 112*b*, 112*c* can identify collisions. For example, different lookup values may share the same m-bits in addition to the same n-bits. In such cases, still more index tables (see FIG. 3) may be used to resolve collisions. In general, a lookup will continue until an index table 112 entry is found that is not marked as a collision.

Though FIG. 2 illustrates two index tables 112*b*, 112*c* branching off from index table 112*a*, this is merely a simplification. If all primary index table 112*a* entries featured collisions 114, the primary index could include references to up to $2^n$ secondary index tables 112*b*, 112*c*, one for each possible primary index value. Similarly, a given secondary index table 112*b*, 112*c* may include references for up to $2^m$ tertiary index tables, and so on.

Though shown as a collection of tables 112*a*–112*c*, a lookup index 120*a* may be implemented using a wide variety of data structures. For example, the index 120*a* may be implemented using linked lists or a combination of tables and linked lists. Additionally, the entries 120*b* and index 120*a* may be integrated. For example, the index tables 112*a*–112*c* may include connection information for non-collision values instead of a reference to a different table 120*b* or database.

Figure 3:
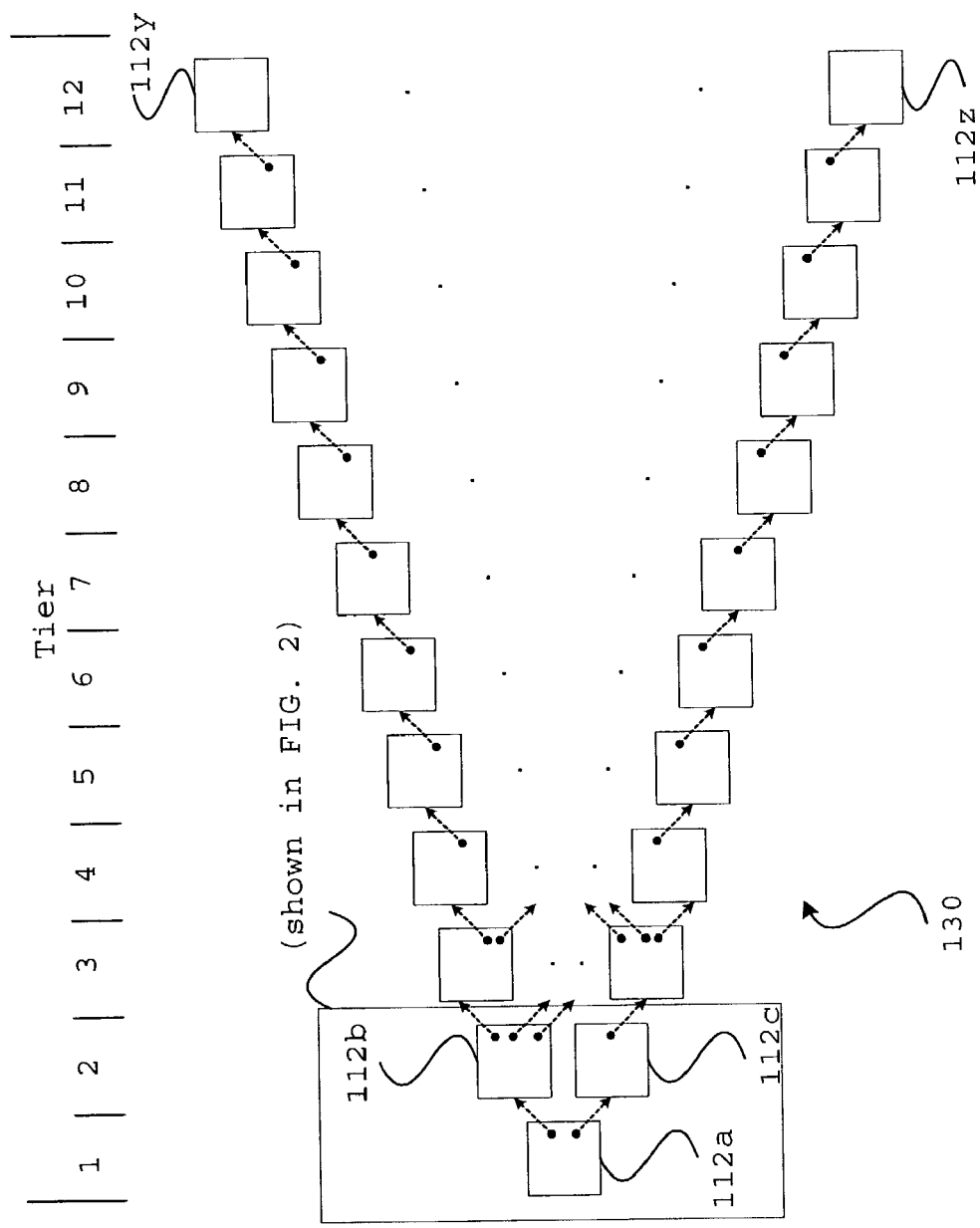

As shown in FIG. 3, a number of index tables 112*a*–112*z* may be accessed to resolve a lookup value. For example, in FIG. 3 depicts twelve different tiers of index tables 112 where a tier corresponds to a particular set of lookup-value bits. In technical terms, the index tables 112 form a data structure known as a "trie".

While a hashing operation can yield a lookup value 110 that can be resolved in the first few tiers of index tables in the vast majority of cases, in a worst-case scenario, each tier may be accessed. Additionally, a worst-case, or near worst-case, scenario may repeatedly occur for a given set of packet characteristics (e.g., a particular connection).

Figure 4:
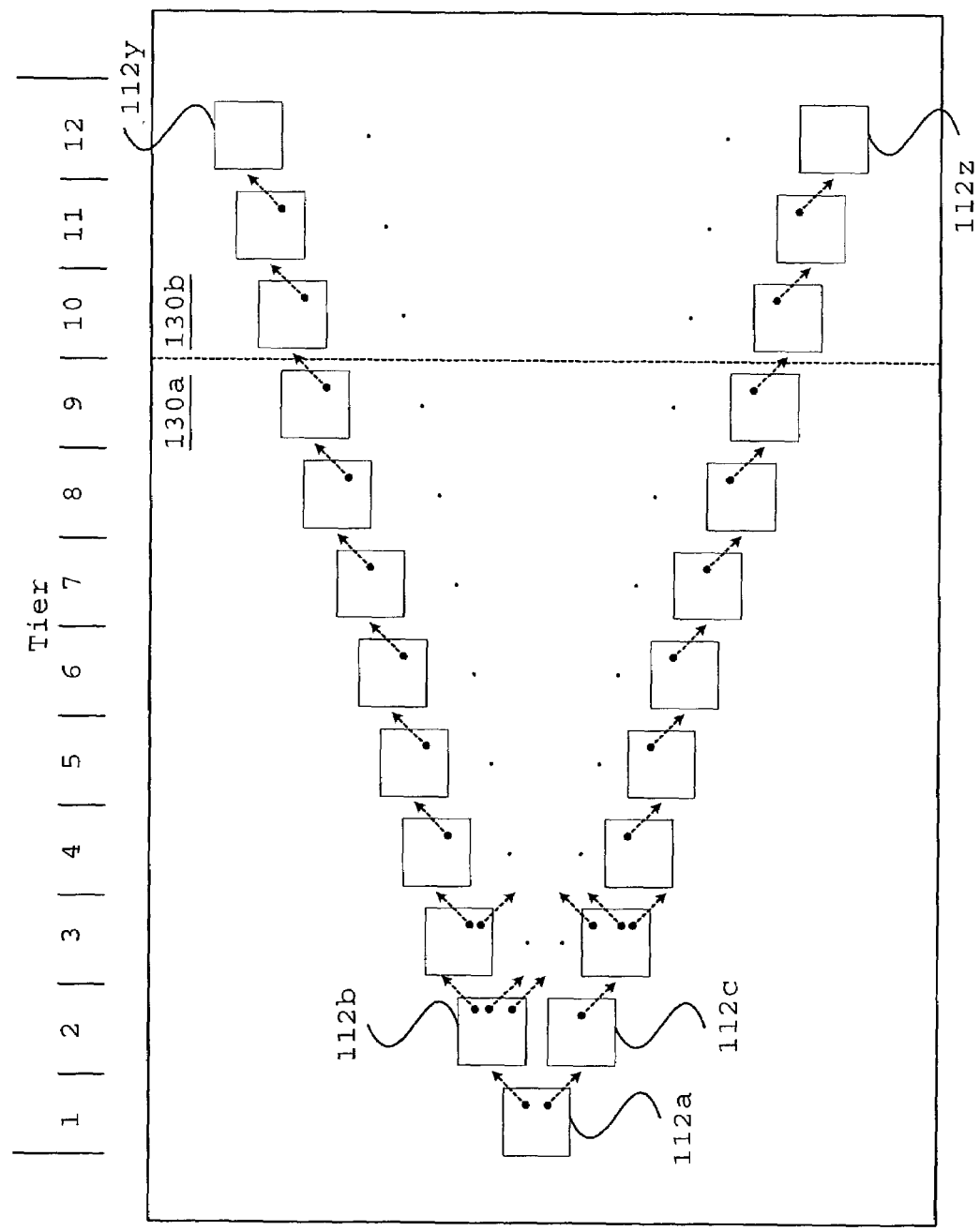

As shown, in FIG. 4, to potentially speed data access in some cases, the index tables 112 may be distributed in different memories. For example, one set of tables 130*a* may reside in a first memory and another set 130*b* in a second memory. For instance, as shown in FIG. 4, the first nine tiers of access tables 130*a* may be stored in a first memory, while the last three tiers of access tables 130*b* are stored in a second, lower latency memory. Generally, the later tiered index tables (e.g., 112*y*, 112*z* in tier 12) are smaller than the initial tables (e.g., 112*a*–112*c*), and therefore, often occupy less space. Thus, the second set of tables 130*b* may be stored without excessive use of lower latency memory.

Thus, if a lookup value is not resolved until the twelfth tier (e.g., table index 112*y* or 112*z*), the last three tiers of index tables may be searched using lower latency memory. This can place a ceiling on the amount of time it takes to perform an index lookup by speeding up the lookup in the worst-case/near worst-case scenarios. In a sense, the lower latency memory forms a kind of "reverse cache" where lower latency memory is accessed as a last, instead of first, resort.

While FIG. 4 illustrates table information distributed based on the tier of an index (e.g., tiers 1–9 130*a* in a first memory and tiers 10–12 130*b* in a second memory), the distribution scheme may vary and may be more irregular. For example, based on the availability of lower latency memory, some index tables within a tier may be distributed across different memories. Additionally, the information may be distributed across more than two memories.

Figure 5:
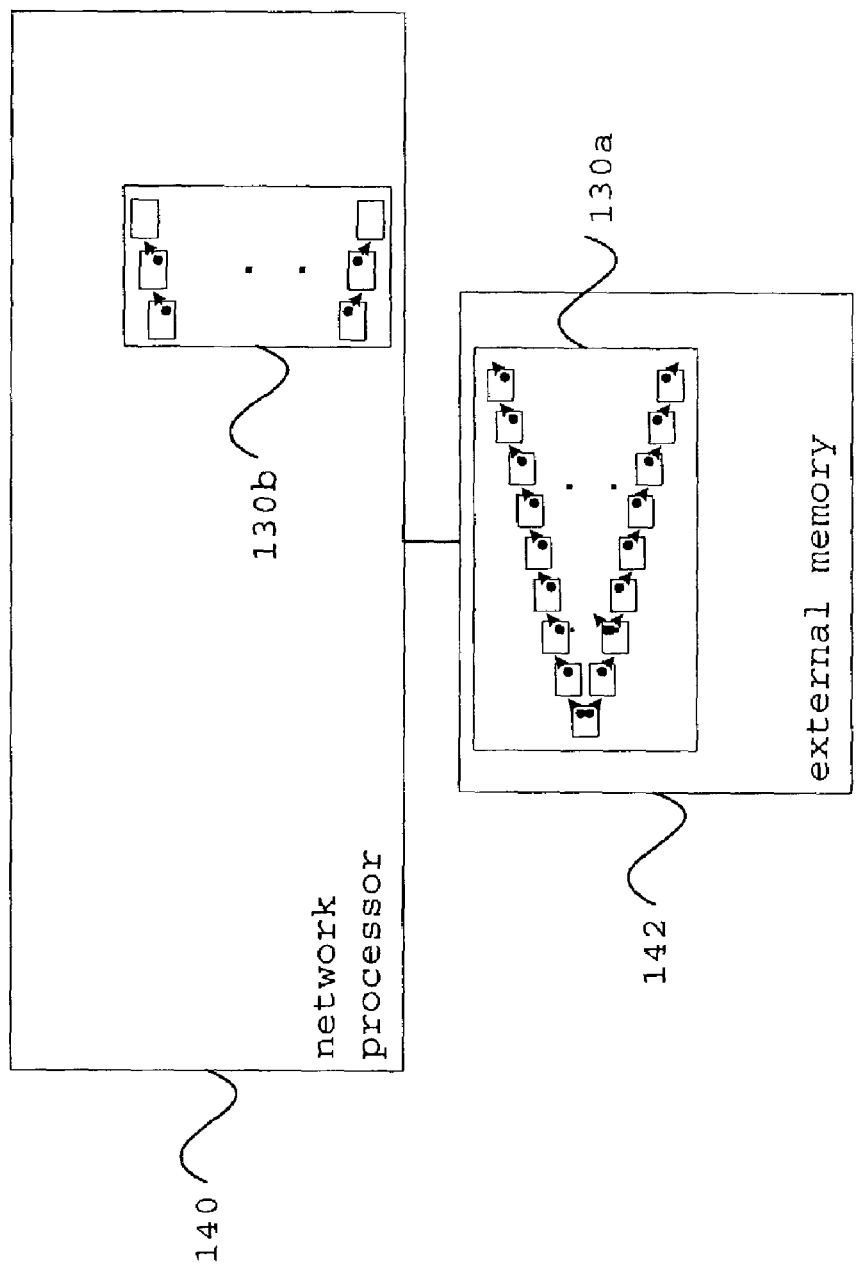
FIG. 5 is a diagram illustrating distribution of lookup information across different memories.

As shown in FIG. 5, the techniques described above may be used by a wide variety of devices including a network processor 140. As shown, in addition to its own memory, the network processor 140 can access external memory 142. As shown, the lookup information 130*a*, 130*b* is distributed between the network processor memory, and memory 142.

Figure 6:
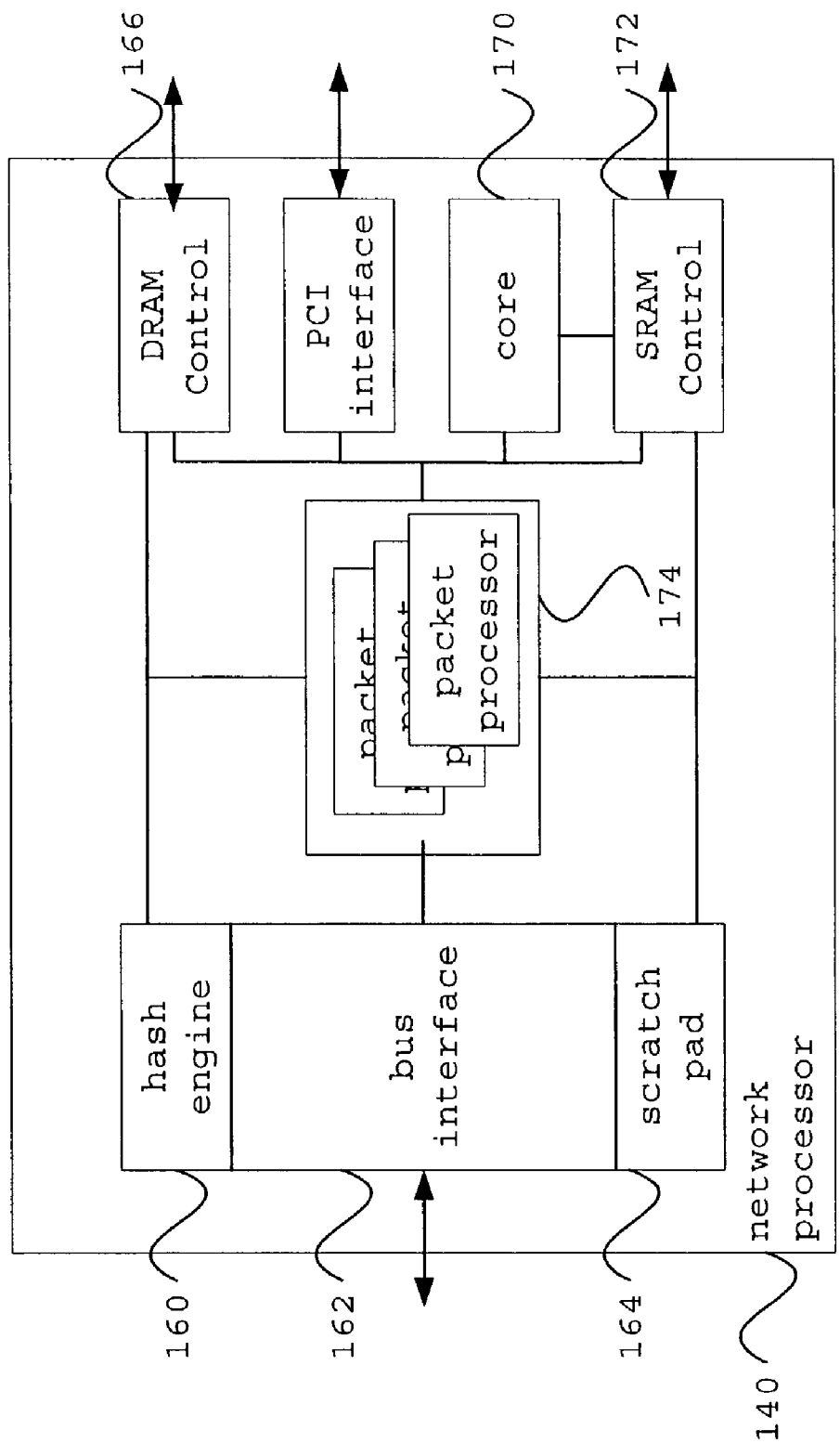
FIG. 6 is a diagram of a network processor.

To provide a specific example, FIG. 6 depicts a schematic of a single-chip network processor 140. The network processor 140 shown in FIG. 6 is an example of an IXP (Internet eXchange network Processor) network processor sold by Intel® Corporation. Other network processors feature different architectures than the IXP example described above.

The network processor 140 shown includes multiple packet processors 174. A packet processor 174 is generally a software programmable Reduced Instruction Set Computer (RISC) processor featuring an architecture optimized for common packet processing tasks (e.g., bit manipulation). These processors 174 typically lack instructions seldom used in packet processing such as floating-point operations, integer multiplication and division, and so forth. A packet processor 174 may be designed for multithreaded operation, for example, by having hardware registers designated for different threads. The packet processor 174 may quickly switch between different threads. This can permit a packet processor 174 to process multiple packets efficiently.

In addition to the packet processors 174, the network processor 140 can also include a core processor 170. For example, the core processor 170 may be general purpose CPU having its own share of low-latency cache memory. The core processor 170 is often programmed to handle tasks (e.g., "control plane" tasks) other than handling data packets such as updating routing tables.

The network processor 140 also includes a bus interface 162 for communicating (e.g., sending and receiving packets) with other network components. The processor 140 shown further includes a hash processor 160 that can perform a hash operation on information included in a packet, for example, to determine a lookup value. The processor also includes interfaces 166, 172 for accessing off-chip memory such as SRAM (Static Random Access Memory) and DRAM (Dynamic Random Access Memory) chips.

The network processor 140 shown can distribute the lookup data between the off-chip memory and on-chip memory resources. On-chip memory resources may include memory offered by the packet processors 174, core 170, and/or scratch pad 164. Generally, the on-chip memory resources will offer lower latency than the off-chip memory. Thus, the later lookup index tables 130*b* may be stored on-chip. The on-chip, 174, 170, 164 memories also vary in the latencies, thus, the information may be distributed among the different on-chip memories, assuming sufficient storage.

The techniques described above may be implemented by programming the packet processors 174. For example, a program may direct a packet processor 174 to search higher latency memory for a first number of index lookups, if needed, and search lower latency memory for the remainder. Alternately, instead of switching memories based on the number of index lookups, the lookup data may identify which memory stores the next lookup data to search. Other implementations may feature different designs. For example, a packet processor 174 may perform some searching and then instruct the core 170 to continue. For instance, the packet processor 174 may be programmed to perform the searching of the higher latency memory while the core 170 may be programmed to perform searching of the lower latency memory. The lookup data may distributed such that the lower latency memory used is the low-latency cache of the core 170. This can permit the core 170 to quickly complete lookups.

Figure 7:
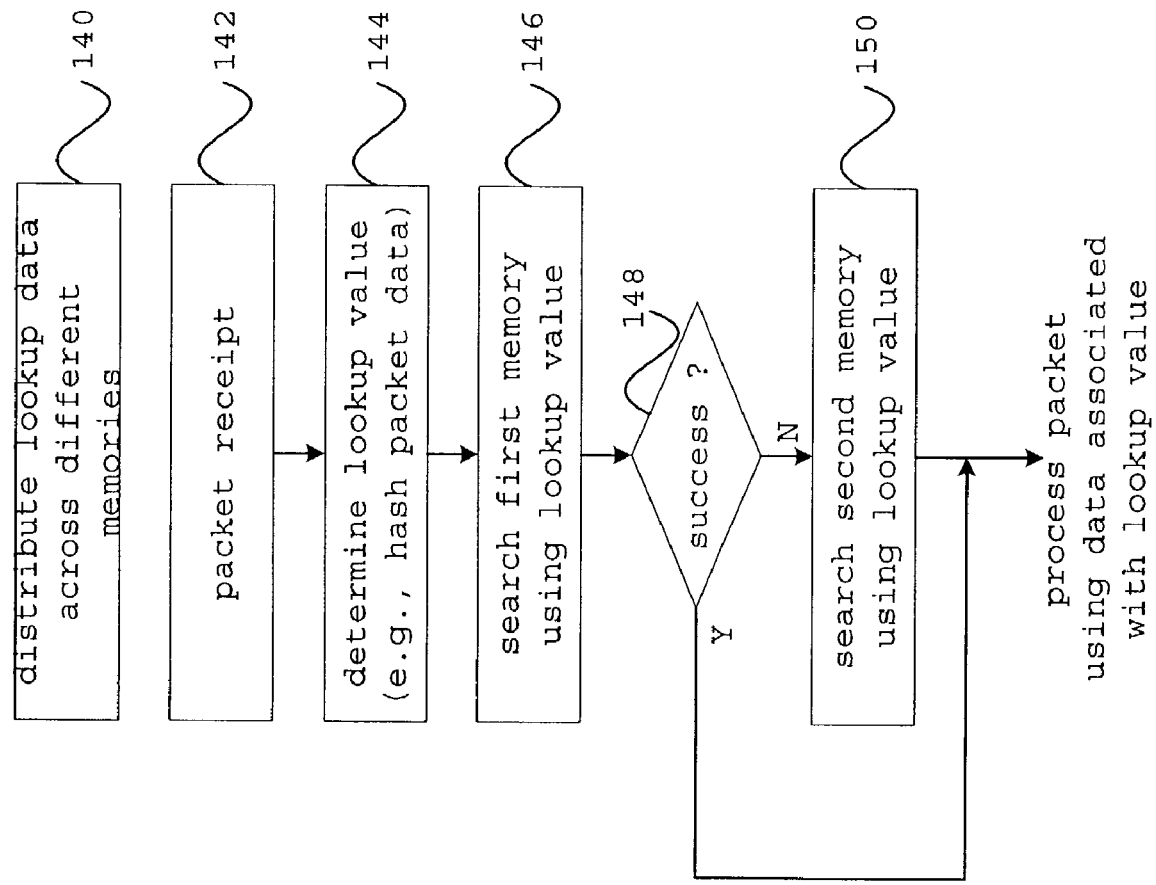
FIG. 7 is a flow chart of a lookup process.

FIG. 7 shows a process for performing lookups using the approach described above. As shown, the process distributes 140 lookup information across different memories. Such distribution may be an on-going operation, for example, as different connections are established and terminated (e.g., lookup value collisions occur and disappear).

After receipt of a packet 142, the process can determine 144 a lookup value for the packet based on its content. For example, the process can hash a combination of information found in the packet's header(s) and/or payload. Based on the determined lookup value, the process can search 146 for an entry corresponding to a lookup value using a first memory. For example, in the sample lookup index shown in FIG. 4, the process may access up to nine different index tables in the first memory. If the search 146 using the first memory fails 148, the process may use the second memory to perform subsequent searches 150. For example, in the sample lookup index shown in FIG. 4, the process may access up to three index tables in the second memory.

Figure 8:
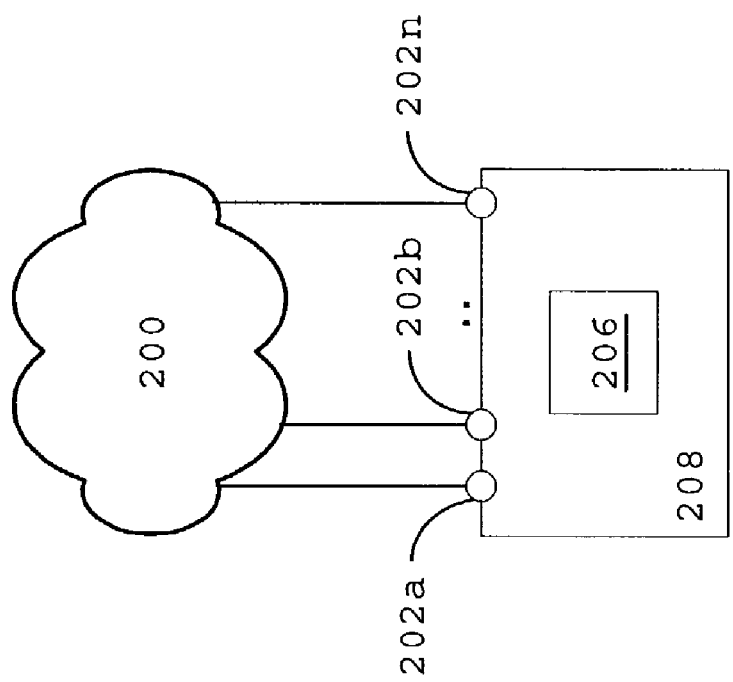
FIG. 8 is a diagram of a network device.

FIG. 8 illustrates a network device 208 that can implement the distributed lookup scheme described above. As shown, the device 208 features a collection of communication ports 202a–202n for communicating with other network 200 devices via transmission mediums (e.g., copper, optic cables, and/or wireless transmission) used by the ports 202a–202n. The device 208 also includes one or more medium access control (MAC) devices for handling data transmission over the transmission mediums (e.g., an Ethernet or SONET MAC controller). As shown the device 208 also includes a processing block 206 that can lookup data for a packet received via the communication ports 202a–202n and MAC devices using the approach described above. The processing block may include a network processor (e.g., the processor illustrated in FIG. 6) or may include other packet processing elements.

The techniques described herein may have applicability in a wide variety of computing or processing environments. For example, a packet may take a variety of forms and include a variety of information based on the network communication protocol(s) being used (e.g., TCP/IP, ATM, FR (Frame Relay), and so forth).

The techniques may be implemented in hardware, software, or a combination of the two. For example, the techniques may be implemented by programming a network processor, programming a single or multiple processor system, or by providing an ASIC so configured.

The computer programs may be implementing using a high level procedural language such as C or an object oriented programming language such as C++. However, the program(s) can be implemented in assembly or machine language if desired. The language may be compiled or interpreted.

Other embodiments are within the scope of the following claims.

What is claimed is:

1. A method for use in looking-up data based on content of a packet received over a network, the method comprising:
   receiving a lookup value based on the received packet;
   searching a first memory using at least a portion of the lookup value;
   if the searching the first memory fails, searching a second memory using at least a portion of the lookup value, the second memory having a lower latency than the first memory;
   wherein the searching of the first memory and the second memory comprises searching a trie having different tiers; and
   wherein the first memory stores index information corresponding to a first set of trie tiers and the second memory stores index information corresponding to a second set of trie tiers.

2. The method of claim 1, wherein the second memory comprises a memory provided by a different chip than the first memory.

3. The method of claim 2, wherein the second memory comprises a memory provided by a network processor.

4. The method of claim 3, wherein the network processor comprises more than one programmable packet processor.

5. The method of claim 4, wherein at least one of the more than one programmable packet processors comprise a processor having registers corresponding to different threads.

6. The method of claim 4, wherein the packet processor comprises a packet processor having an instruction set that does not feature floating point operation instructions.

7. The method of claim 1, further comprising, determining the lookup value.

8. The method of claim 7, wherein determining the lookup value comprises hashing at least a portion of data included in the packet's header(s).

9. The method of claim 8, wherein the at least a portion of the packet header comprises the source address, destination address, source port, and destination port.

10. The method of claim 1, further comprising, retrieving data associated with the lookup value.

11. The method of claim 10, wherein the retrieving data comprises retrieving connection information for the packet.

12. The method of claim 11, wherein the connection information comprises at least an outgoing interface.

13. The method of claim 1, further comprising, distributing lookup information across the first and second memories.

14. The method of claim 1, wherein the searching the first memory comprises searching performed by a first processor and wherein the searching the second memory comprises searching performed by a second processor.

15. A computer program product, disposed on a computer readable storage medium, for use in looking-up data based on content of a packet received over a network, the program comprising instructions for causing a processor to:
   receive a lookup value based on the received packet;
   search a first memory using at least a portion of the lookup value;
   if the search of the first memory fails, search a second memory using at least a portion of the lookup value, the second memory having a lower latency than the first memory; and
   wherein the instructions for causing the processor to search the first and second memories comprise instructions for causing the processor to search a trie having different tiers, the first memory storing index information corresponding to a first set of trie tiers and the second memory storing index information corresponding to a second set of trie tiers.

16. The program of claim 15, wherein the second memory comprises a memory provided by a different chip than the first memory.

17. The program of claim 16, wherein the second memory comprises a memory provided by a network processor having more than one programmable packet processors.

18. The program of claim 15, wherein the lookup value comprises a hash of at least a portion of data included in the packet's header(s).

19. The program of claim 15, further comprising, instructions for causing the processor to retrieve data associated with the lookup value.

20. The program of claim 19, wherein the instructions for causing the processor to retrieve data comprise instructions for causing the processor to retrieve connection information for the packet.

21. A system for looking-up data based on content of a packet received over a network, the system comprising:
   at least one communication port;
   at least one Ethernet MAC (Medium Access Control) device coupled to at least one of the at least one communication ports;
   at least one processor having access to the at least one Ethernet MAC device and access to a first memory and a second memory, the second memory having a lower latency than the first memory;
   instructions, disposed on a computer readable storage medium, for causing at least one of the at least one of the processors to:
   receive a lookup value based on the received packet;
   search the first memory using at least a portion of the lookup value;
   if the search of the first memory fails, search a second memory using at least a portion of the lookup value;
   wherein the instructions that cause the at least one processor to search comprise instructions that cause the at least one programmable packet processor to search a trie having different tiers; and
   wherein the first memory stores index information corresponding to a first set of trie tiers and the second memory stores index information corresponding to a second set of trie tiers.

22. The system of claim 21, wherein the second memory comprises a memory provided by a different chip than the first memory and wherein the second memory comprises a memory provided by the same chip having the more than one programmable packet processors.

23. The system of claim 21, wherein the lookup value comprises a hash of at least a portion of data included in the packet's header(s).

24. The system of claim 21, further comprising, instructions for causing the at least one processor to retrieve data associated with the lookup value.

25. The system of claim 24, wherein the data comprises connection information for the packet.

* * * * *